(12) United States Patent
Tingley et al.

(10) Patent No.: US 7,260,648 B2
(45) Date of Patent: Aug. 21, 2007

(54) EXTENSION OF ADDRESS RESOLUTION PROTOCOL (ARP) FOR INTERNET PROTOCOL (IP) VIRTUAL NETWORKS

(75) Inventors: Chase T. Tingley, Somerville, MA (US); Robert J. Walsh, Ashland, MA (US)

(73) Assignee: Ericsson, Inc., Warrendale, PA (US)

( * ) Notice: Subject to any disclaimer, the term of this patent is extended or adjusted under 35 U.S.C. 154(b) by 764 days.

(21) Appl. No.: 10/054,522

(22) Filed: Jan. 22, 2002

(65) Prior Publication Data

US 2002/0138628 A1    Sep. 26, 2002

Related U.S. Application Data

(60) Provisional application No. 60/264,144, filed on Jan. 25, 2001.

(51) Int. Cl.
*G06F 15/16* (2006.01)

(52) U.S. Cl. ............... 709/245; 709/238; 709/242; 709/227; 709/228

(58) Field of Classification Search ........... 709/245, 709/238
See application file for complete search history.

(56) References Cited

U.S. PATENT DOCUMENTS

| | | | | |
|---|---|---|---|---|
| 5,812,533 A | * | 9/1998 | Cox et al. | 370/259 |
| 5,959,990 A | * | 9/1999 | Frantz et al. | 370/392 |
| 5,978,378 A | * | 11/1999 | Van Seters et al. | 370/401 |
| 6,061,334 A | * | 5/2000 | Berlovitch et al. | 370/255 |
| 6,195,356 B1 | * | 2/2001 | Anello et al. | 370/398 |
| 6,711,171 B1 | * | 3/2004 | Dobbins et al. | 370/400 |

* cited by examiner

*Primary Examiner*—Rupal Dharia
*Assistant Examiner*—Nicholas R Taylor
(74) *Attorney, Agent, or Firm*—Ansel M. Schwartz (57) ABSTRACT

A system for supporting translation of virtual IP addresses to Ethernet/MAC addresses in a multi-Virtual Network environment, in which address resolution tables are generated and maintained by Virtual Networking Devices. Virtual Networking Device (VND) sends and/or receives Virtual Network-specific ARP traffic. The Virtual Network-specific ARP traffic includes ARP requests or responses that map a MAC address to an IP address in the private IP address space of an associated Virtual Private Network. The disclosed Virtual Networking Devices can therefore operate in configurations in which multiple independent entities operate on separate Virtual Networks, and where servers may be accessible via virtual IP addresses within the private IP address spaces of associated Virtual Networks.

15 Claims, 8 Drawing Sheets

EXTENSION OF ADDRESS RESOLUTION PROTOCOL (ARP) FOR INTERNET PROTOCOL (IP) VIRTUAL NETWORKS

CROSS REFERENCE TO RELATED APPLICATIONS

This application claims priority under 35 USC §119(e) to provisional application ser. No. 60/264,144 entitled "EXTENSION OF ADDRESS RESOLUTION PROTOCOL FOR IP VIRTUAL NETWORKS", and filed Jan. 25, 2001.

STATEMENT REGARDING FEDERALLY SPONSORED RESEARCH OR DEVELOPMENT

N/A

BACKGROUND OF THE INVENTION

The present invention relates generally to computer networks and communication systems, and more specifically to a system and a method for extending the address resolution protocol (ARP) for use in Internet Protocol (IP) Virtual Networks.

A Virtual Network is an allocation of networking resources that enables independent networking operation over a physical network of devices on which it is configured. In other words, a Virtual Network may be configured over a core set of networking devices, such as devices commonly referred to as switches and/or routers, to enable a geographically distributed group of hosts to interact and be managed as a single logical network. Some Virtual Networks are referred to as Virtual Private Networks (VPNs). The "private" aspect of a Virtual Network may refer to the use of procedures to ensure secure communications over the Virtual Network, by providing confidentiality, message integrity and authentication among participating users and hosts. Virtual Networks may also be private in the sense that they are accessible only to associated sets of users. Accordingly, any Virtual Network with controlled access may be considered a Virtual Private Network. Various existing carrier services provide such controlled access Virtual Networks, including Multi-Protocol Label Switching (MPLS) based services.

As it is generally known, MPLS integrates what is generally referred to as "Layer 2 information" describing individual network links in terms of their bandwidth, latency, and/or utilization, into the Internet Protocol (IP) Layer 3 of an autonomous network, such as a router core operated by an Internet Service Provider (ISP). When packets enter an MPLS-based network, Label Edge Routers (LERs) give them a label (identifier). These labels not only contain information based on the routing table entry associated with the received packet, (i.e., destination, bandwidth, delay, and other metrics), but also refer to the source IP address, Layer 4 socket number information, and differentiated service attributes. Once this classification is complete and mapped, different packets are assigned to corresponding Labeled Switch Paths (LSPs), in which Label Switch Routers (LSRs) place outgoing labels on the packets. By use of these LSPs, network operators can divert and route traffic based on data-stream type and Internet-access customer, thus effectively creating a limited access Virtual Network.

In various types of Virtual Networks, including MPLS provided Virtual Networks, an independent, associated IP address space may be associated with each Virtual Network. Such a Virtual Network may be referred to as a Virtual IP Network. For the purposes herein, the term Virtual Networking Device (VND) will be used to refer to a networking device capable of simultaneously handling traffic on multiple Virtual IP Networks.

As it is generally known, the Address Resolution Protocol (ARP), as defined in Request for Comments (RFC) 826, provides mappings between IP addresses and Ethernet (MAC) addresses within a network. As it is generally known, IP addresses are layer 3 addresses in the Open Systems Interconnection (OSI) model. Layer 3 addresses are also referred to as Network layer addresses. The Network layer is concerned with knowing the address of the neighboring nodes in the network and selecting routes through the network. Routers are typically considered to be layer 3 devices, and the routing of packets through a network is often based on layer 3 addresses contained within packets.

In existing systems, when a router wishes to send data to another device connected via Ethernet or Gigabit Ethernet link, it issues an ARP request containing the IP address of that device. The ARP request is then broadcast to all devices on a shared physical link to which the router is connected. The destination device, seeing its own IP address in the request, then responds with an ARP reply containing its own Ethernet address. The original sender can then store the mapping of the IP address to the Ethernet address internally and use it to generate Ethernet headers for outgoing data traffic having that IP address as a destination address. This approach breaks down when devices are capable of being connected to multiple Virtual IP Networks at the same time, since hosts on separate Virtual Networks that share a physical link may both wish to use the same IP address.

It would therefore be desirable to have a system for translating IP addresses to Ethernet/MAC addresses that operates correctly in the case where a networking device is connected to multiple Virtual IP Networks.

BRIEF SUMMARY OF THE INVENTION

In accordance with the present invention, a system for translating IP addresses to Ethernet/MAC addresses is disclosed, which generates and maintains address resolution tables. In the disclosed system, a Virtual Networking Device (VND) sends and/or receives Virtual Network-specific ARP traffic. The Virtual Network-specific ARP traffic includes ARP requests and/or responses that map an IP address to an Ethernet address in the private IP address space of an associated Virtual Private Network. The disclosed Virtual Networking Devices can therefore operate in configurations in which multiple independent entities operate on separate Virtual Networks, and where software servers executing in hardware server systems are providing network services such as data storage, Web hosting, and where such servers may be accessible via virtual IP addresses within the private IP address spaces of associated Virtual Networks.

The disclosed system provides an Ethernet/MAC layer mapping for the IP-level private address space of a Virtual Network. The addresses within an IP-level private address space of a Virtual Network are referred to herein as the virtual IP-addresses of that Virtual Network. The disclosed system uses at least one predetermined field within each ARP packet to resolve mappings between a single physical Ethernet/MAC address and multiple associated virtual IP addresses in a Virtual Network. Packets transmitted on different Virtual Networks include distinguishing identifier values, referred to as Virtual Network Identifiers, in one or more predetermined packet fields. Each Virtual Network Identifier uniquely identifies an associated Virtual Network. A software entity on each Virtual Networking Device forms and maintains the mappings from Virtual Network Identifiers to Virtual Networks, and vice-versa. These mappings are stored in per-Virtual Network address resolution tables. The combination of a virtual IP address and a Virtual Network Identifier is sufficient to uniquely specify the target of an ARP request message. A device receiving an ARP request containing such information issues a reply containing its physical address, as well as the same Virtual Network Identifier used in the request.

In a configuration in which devices attached to a core network are not aware of the Virtual Network they use, a switch or bridge at the edge of the core network may be capable of assigning port-based Virtual Networks can be used to distribute packets to the proper servers. In such a configuration, the switch or bridge uses the Virtual Network identifier included in the packet by a Virtual Networking Device within the core network to determine which server should receive a given packet received from the core network. The switch or bridge then strips the field or fields containing the Virtual Network Identifier from the packet and forwards the packet conventionally, for example as an Ethernet packet, to the indicated server system. The switch or bridge serves a similar purpose for packets being sent from the external server systems to the Virtual Networking Device within the core network by inserting Virtual Network Identifier information into the packet header to mark it as belonging to a particular Virtual Network.

Further in the disclosed system, rather than maintain a single table of ARP mappings, each Virtual Networking Device maintains a separate table for each Virtual Network that requires address translation. When attempting to transmit IP traffic over a given Virtual Network, the Virtual Networking Device looks up the entry corresponding to the destination IP address in the translation table for that Virtual Network.

Any related auxiliary tables may also be replicated on a per Virtual Network basis. For example, in one embodiment, each Virtual Networking Device maintains a separate list of "unresolved" ARP mappings, consisting of IP addresses for which ARP requests have already been sent, but for which responses have not yet been received. Such related auxiliary tables are maintained on a per-Virtual Network basis in order to allow the Virtual Networking Device to perform simultaneous translation of the same IP address on multiple Virtual Networks.

The disclosed system functions properly in a configuration in which a single link is allocated in its entirety for use by a single Virtual IP Network. In such a configuration, the Virtual Networking Device can use the conventional ARP protocol over the link, and store the resulting address mappings in the translation table for the Virtual Network to which the link is allocated.

In a configuration in which multiple Virtual Networks exist, and where the Virtual Networking Device is located within a core network that uses Multi-Protocol Label Switching (MPLS), the disclosed system may use the encapsulating properties of MPLS to isolate the data traffic flowing across different Virtual Networks. For example, when the Virtual Networking Device is attached to a link such as Ethernet or Gigabit Ethernet, the Virtual Networking Device must use ARP to discover Layer 2 address information for other box(es) on that link in order to transmit the MPLS packets. The disclosed system may again use the conventional ARP protocol in this scenario, since the encapsulating property of MPLS separates the Virtual IP Network traffic from the physical link. Accordingly, the Virtual Networking Device issues an ARP request for the IP address of the next-hop router used by each MPLS tunnel, and each next-hop system will issue a response with its physical address. All data sent through a given MPLS tunnel regardless of which Virtual Network it is on, will then be transmitted using the physical address of the next-hop system.

BRIEF DESCRIPTION OF THE SEVERAL VIEWS OF THE DRAWING

The foregoing features of this invention, as well as the invention itself, may be more fully understood from the following Detailed Description of the Invention, and the Drawings, of which.

DETAILED DESCRIPTION OF THE INVENTION

All disclosures of United States provisional patent application ser. No. 60/264,144 entitled "EXTENSION OF ADDRESS RESOLUTION PROTOCOL FOR IP VIRTUAL NETWORKS", and filed Jan. 25, 2001, are hereby incorporated by reference herein.

Figure 1:
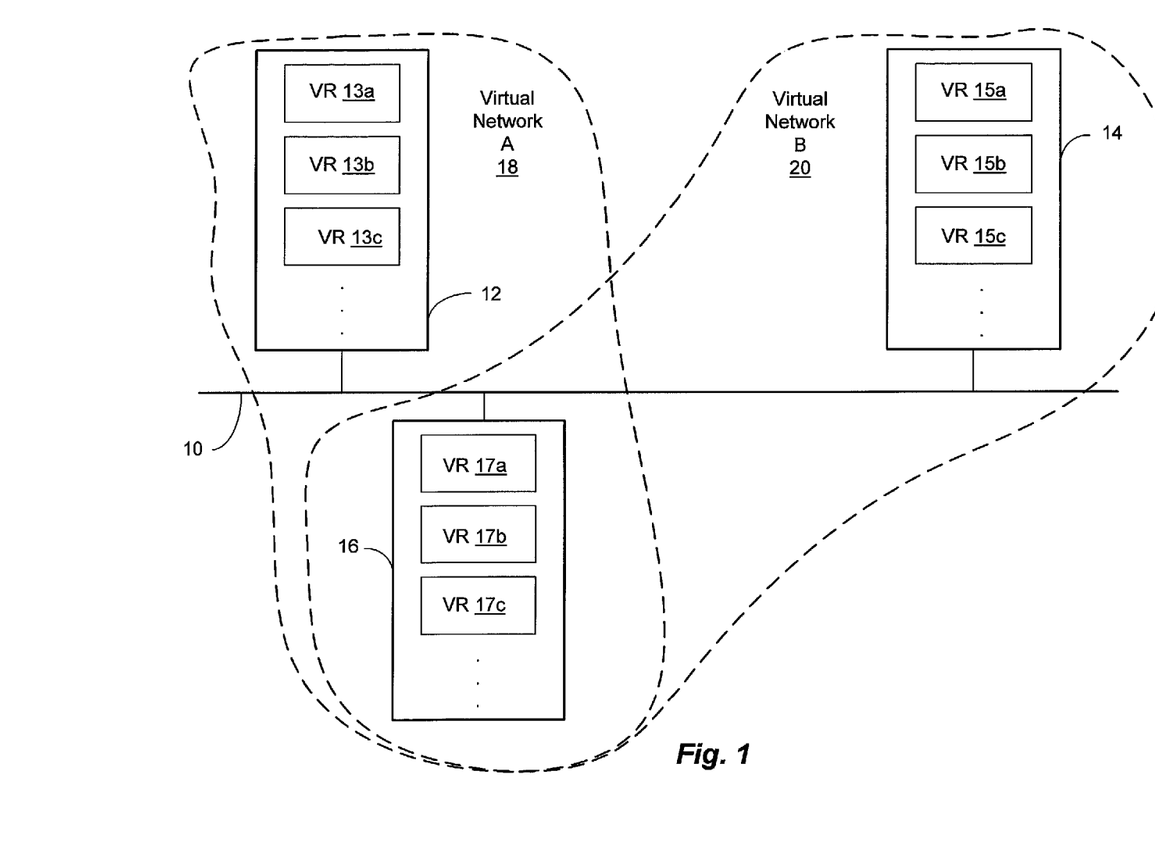
FIG. 1 shows a communication link and attached devices over which multiple Virtual Networks are established.

FIG. 1 shows a communication link 10, such as an Ethernet or Gigabit Ethernet link, as well as Virtual Networking Device 12, Virtual Networking Device 14, and Virtual Networking Device 16 that are each communicably coupled to the communication link 10. The devices shown in FIG. 1 are configured such that Virtual Networking Device 12 and Virtual Networking Device 16 are both within a Virtual Network A 18, and Virtual Networking Device 16 and Virtual Networking Device 14 are both within a Virtual Network B 20. The Virtual Network Devices 12, 14 and 16 may, for purposes of illustration, each consist of one or more processors and associated memory for program code storage, as well various input/output (I/O) subsystems. The functionality described herein may be implemented in software, firmware, or specialized hardware located within the Virtual Networking Devices 12, 14 and/or 16.

Each of the Virtual Networking Devices 12, 14 and 16 are shown including a number of software entities referred to as Virtual Routers. Specifically, Virtual Networking Device 12 is shown including Virtual Routers 13a, 13b and 13c, Virtual Networking Device 14 is shown including Virtual Routers 15a, 15b and 15c, and Virtual Networking Device 16 is shown including Virtual Routers 17a, 17b and 17c.

Each of the Virtual Routers shown in FIG. 1 is represented in the memory of the Virtual Networking Device in which it is stored by an associated routing context. In the illustrative embodiment of FIG. 1, each Virtual Router may be a Virtual Access Router, Virtual Internet Router, Virtual Backbone Router, and/or Virtual Management Router, depending on how it is configured and used. Each Virtual Router further includes its own private routing table.

A Virtual Backbone Router (VBR) is configured and used to support communication among the Virtual Networking Devices 12, 14 and 16 of FIG. 1. For example, when the Virtual Networking Devices 12, 14 and 16 are part of a private switched network, a Virtual Backbone Router (VBR) within each of the Virtual Networking Devices 12, 14 and 16 operates to perform routing of packets among the Virtual Networking Devices 12, 14 and 16. In this way, each Virtual Backbone Router (VBR) handles traffic for the private switched network in which it is located, and may run arbitrary routing protocols. In such an illustrative embodiment, a single Virtual Backbone Router is created in each Virtual Networking Device by default, and is always present whenever the Virtual Networking Device is operational. The Virtual Backbone Router further operates as the last Virtual Router to remain running during a planned shutdown of a Virtual Networking Device.

A Virtual Access Router (VAR) is a Virtual Router that functions as a node in a Virtual Private Network, such as the Virtual Network A 18 or Virtual Network B 20 of FIG. 1. There can be many Virtual Access Routers in a given Virtual Networking Device, each handling different customers/networks. For example, separate Virtual Access Routers would handle traffic for Virtual Network A 18 and Virtual Network B 20 in FIG. 1. The creation, destruction, and configuration of each Virtual Access Router is directed by a system administrator responsible for the Virtual Networking Device on which the Virtual Access Router executes. During operation, a Virtual Access Router handles Virtual Network traffic in an associated private address space, and may run various routing protocols as necessary. For example, each Virtual Access Router may operate to provide a routing protocol associated with its Virtual Network, such as RIP (Routing Information Protocol), OSPF (Open Shortest Path First), BGP (Border Gateway Protocol), or ISIS (Intermediate System-Intermediate System).

A Virtual Internet Router (VIR) is a Virtual Router that operates to perform Internet routing. As in the case of Virtual Access Routers, there may be several Virtual Internet Routers in a given Virtual Networking Device. A Virtual Internet Router operates as an aggregation router, by sitting on the edge of a customer network and connecting that network to the larger Internet. In such an embodiment, there may be one Virtual Networking Device associated with each Internet provider for the customer network. Accordingly, the Virtual Internet Router handles public network traffic, using a non-private address space. Additionally, a Virtual Internet Router could have MPLS switching enabled for communications on an MPLS switched network which accesses the Internet. In this way, a Virtual Networking Device coupled to a client network through a single ATM (Asynchronous Transfer Mode) link could process Virtual Internet Router traffic and Virtual Access Router traffic over that ATM link.

A single Virtual Management Router (VMR) is also provided for each Virtual Networking Device. The Virtual Management Router is responsible for routing management traffic such a SNMP. The Virtual Management Router also contains client and server functionality for the Telnet protocol and the File Transfer Protocol (FTP).

In one embodiment, each routing protocol supported by a given Virtual Networking Device is provided with an associated software component referred to as a protocol task. In combination with the contextual information maintained on a per-Virtual Router basis, this architecture allows a single protocol task to operate like several protocol tasks for several Virtual Networks. Global state information for each protocol task is packaged and replicated for each Virtual Router associated with the protocol task, and a global pointer to the current set of state information is set on a per-packet basis. This approach forces the protocol task to process a received packet in its entirety before servicing a packet for a different Virtual Router.

Specifically, during operation of a Virtual Networking Device, a single protocol task may be spawned for each of the major routing components—IP (including RIP), OSPF, ISIS, and BGP. Each of these protocol tasks maintains multiple routing "contexts." Each context is used to process packets destined for a given Virtual Router. This approach ensures that from the point of view of a routing context, processing of each packet is an atomic operation. That is, if Virtual Router A and Virtual Route B are both running OSPF and both receive LSAs (Link State Advertisements) from a neighbor, the OSPF task will process one of these LSPs in its entirety before looking at the other. In order to differentiate the packets of different routing contexts, in an illustrative embodiment, each context has a context identifier value that identifies it.

Consistent with the disclosed aggregate processing of multiple routing contexts in a single protocol task, the disclosed system also provides a technique for scheduling individual Virtual Routers. For example, it may be desirable to issue a periodic message, referred to as a "tic" message, that causes one or more Virtual Routers to begin execution. In a first embodiment, a single timer task is provided within each Virtual Networking Device to send a "tic" message to a given routing protocol task once per second. Upon receiving this message, the protocol task would cycle through all of its associated Virtual Router contexts in succession, in order to give each Virtual Router a chance to process any timer-driven events, TCP retransmits, or other events. Alternatively, separate timer tasks may be provided for individual protocol tasks in order to avoid potential spikes in activity associated with using a single global timer task to trigger all protocol tasks. In such an alternative embodiment, the individual timer tasks associated with each protocol task operate to self-adjust their frequency in response to the number of Virtual Routers they are each associated with. Alternatively, a global timer function could be used that provides tic messages at selectable frequencies on a per-protocol task basis. In this alternative embodiment, routing protocol tasks would register with the global timer through an API (Application Programming Interface), providing a callback routine to be used periodically to send a tic message to them at a specified interval.

During operation of the devices shown in FIG. 1, Virtual Network A 18 and Virtual Network B 20 are each provided with an associated private IP address space. The IP addresses within the private IP address spaces for Virtual Network A and Virtual Network B are referred to as "virtual" IP addresses. It is possible that the same "virtual" IP address could be used within both Virtual Network A 18 and Virtual Network B 20.

For example, the virtual IP address 10.0.0.1 could be used to refer to the Virtual Networking Device 12 in Virtual Network A 18, and also used to refer to Virtual Networking Device 14 in Virtual Network B 20. During operation of the devices shown in FIG. 1, Virtual Networking Device 16 distinguishes between references to such a duplicated IP addresses on a per-Virtual Network basis, when determining mappings between IP addresses and the physical addresses of devices. Such device physical addresses are referred to herein for purposes of illustration as Ethernet/MAC addresses.

Figure 2:
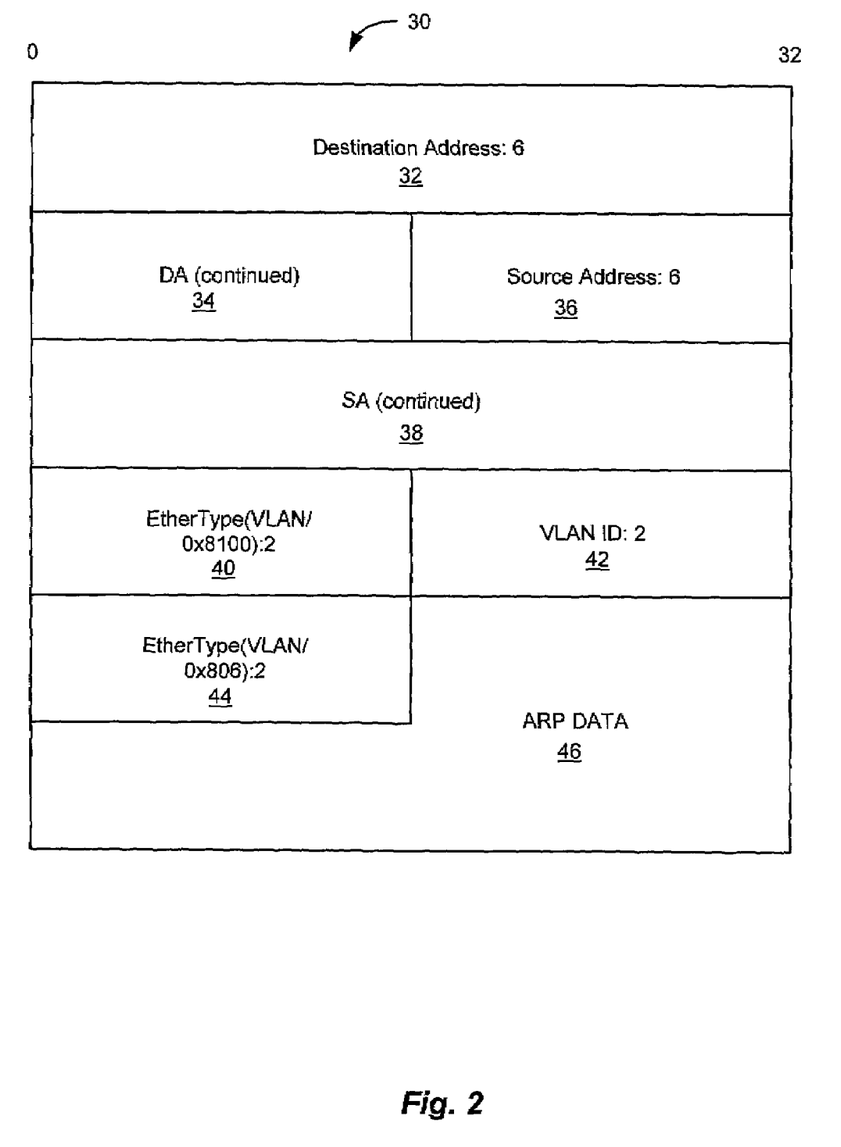
FIG. 2 shows the format of an ARP request message in accordance with the disclosed system.

FIG. 2 shows the format of a message 30 requesting an Ethernet/MAC address corresponding to an IP address. The IP address for which the Ethernet/MAC address is being requested may, for example, consist of a virtual IP address associated with one of the Virtual Networks shown in FIG. 1. The Destination Address fields 32 and 34 contain the destination Ethernet address to which the packet is sent. The Source Address fields 36 and 38 contain the Ethernet address of the device requesting the Ethernet/MAC address.

The EtherType fields 40 and 44 include values indicating that the packet is an ARP packet, and the ARP data field 46 may contain any other relevant data. ARP packets may be requests or responses, as indicated by the contents of the ARP data 46. The ARP data 46 further includes the IP address for which the corresponding Ethernet/MAC address is being requested, in the case of an ARP request packet.

The value stored in the VLAN ID field 42 is a virtual network identifier that identifies the Virtual Network that is relevant to the packet. In other words, in the case of an ARP request packet, the value of the VLAN ID field 42 is used by the receiving Virtual Networking Device to determine a Virtual Router responsible for responding to the request 30. The Virtual Router associated with the value in the VLAN ID field 42 then operates to translate the IP address of the request into the associated Ethernet/MAC address, for example using the translation table 120 shown in FIG. 5. If no entry is found in the table 120 matching the IP address of the request and the Virtual Network indicated by the contents of the VLAN ID field 42, then no response message is generated by the Virtual Networking Device that received the request message 30. In this way, only the Virtual Networking Device configured within the Virtual Network associated with the request message 30 will return an Ethernet/MAC address to the requesting device. The combination of virtual IP address and VLAN ID within an ARP request is sufficient to uniquely specify the target of that ARP request. A host receiving a VLAN-encapsulated ARP request message 30 issues a reply containing its physical address, as well as the VLAN ID used in the request.

Figure 3:
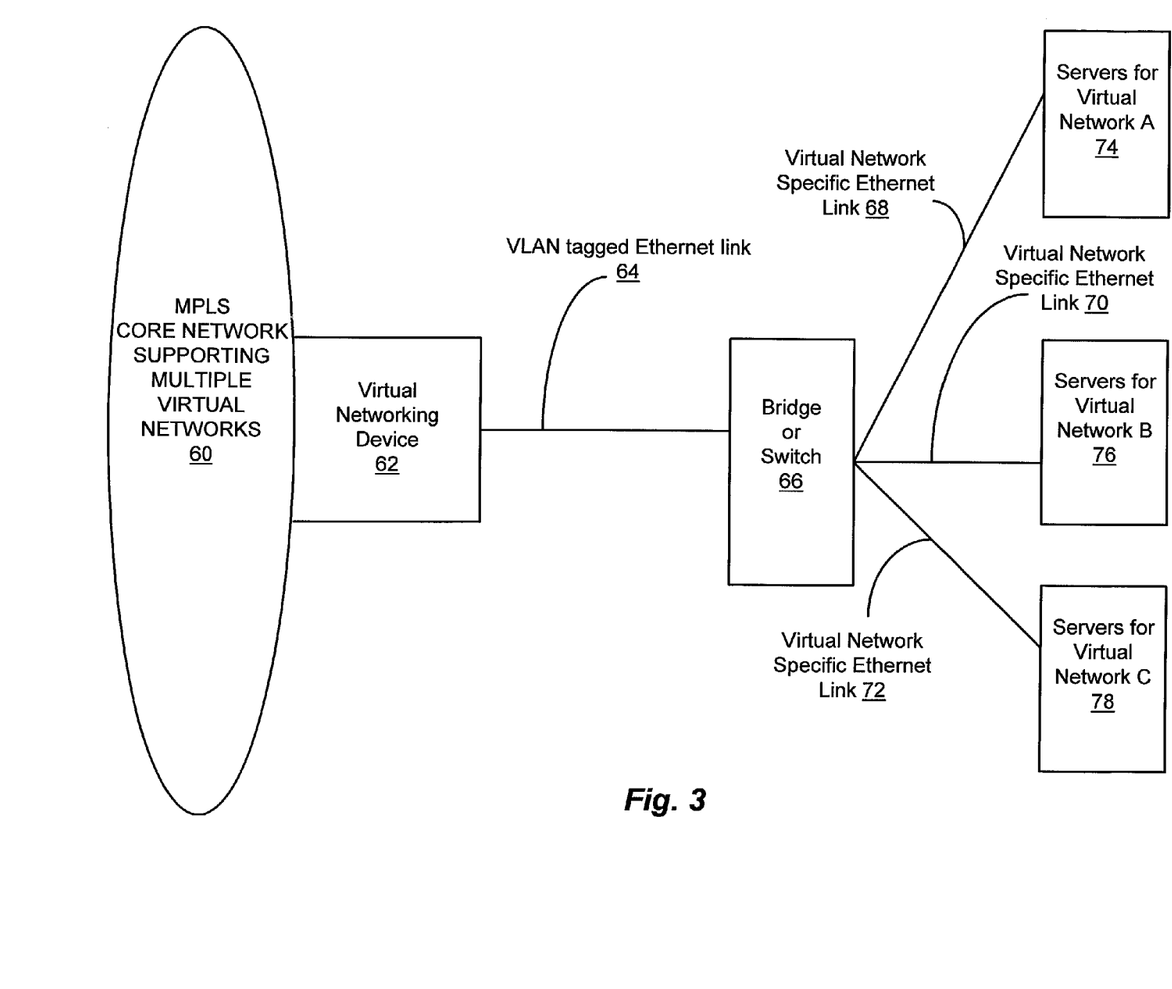
FIG. 3 shows a server farm configuration of the disclosed system.

Using the disclosed system, a Virtual Networking Device with one or more attached Ethernet interfaces may employ various specific strategies to distinguish ARP traffic on different Virtual Networks. For example, as shown in FIG. 3, a Virtual Networking Device 62 is shown attached to a core network 60 supporting multiple Virtual Networks. For purposes of illustration the core network 60 is depicted as an MPLS core network. A single Ethernet link 64 is shown connecting the Virtual Networking Device 62 with a bridge or switch 66. The bridge or switch 66 aggregates packets received from a server farm shown including Servers for Virtual Network A 74, Servers for Virtual Network B 76, and Servers for Virtual Network C 78.

The aggregate packets received by the bridge or switch 66 from the sets of servers 74, 76 and 78 are forwarded by the bridge or switch 66 over the Ethernet link 64 to the Virtual Networking Device 62 for transport over the associated Virtual Network within the core network 60.

The bridge or switch 66 further operates to distribute packets received over the Ethernet link 64 to the sets of Virtual Network specific servers 74, 76, and 78. Each of the sets of servers 74, 76 and 78 is available only to traffic on an associated Virtual Network. For example, the Servers for Virtual Network A 74 are only available to requests from Virtual Network A, the Servers for Virtual Network B 76 are only available to requests from Virtual Network B, and the Servers for Virtual Network C are only available to requests from Virtual Network C. The bridge or switch 66 operates to forward requests received from Virtual Network A on the core network 60 over Ethernet link 68, forward requests received from Virtual Network B on the core network 60 over Ethernet link 70, and forward requests received from Virtual Network C on the core network 60 over Ethernet link 72. Since each of the Ethernet links 68, 70 and 72 are connected only to servers associated with a given Virtual Network, the Ethernet links 68, 70 and 72 are each Virtual Network specific, in that packets carried over a given one of the Ethernet links 68, 70 and 72 are only seen by one of the sets of servers 74, 76 and 78.

During operation of the embodiment shown in FIG. 3, packets carried over the Ethernet link 64 contain VLAN ID fields in their headers, for example consistent with the format set forth in IEEE 802.1q (December, 1998). Further during operation of the embodiment shown in FIG. 3, packets carried over the Ethernet links 68, 70 and 72 do not include VLAN ID fields. While packets directed to the server systems are encapsulated with different VLAN headers, the switch or bridge 66 may be used to convert information in the VLAN headers to a port-based packet distribution.

The individual servers within the sets of servers 74, 76 and 78 are each associated with a virtual IP address from the private address space of the associated Virtual Network. Accordingly, servers within server set 74 are accessible using virtual IP addresses within the private IP address space of Virtual Network A, servers within server set 76 are accessible using virtual IP addresses within the private IP address space of Virtual Network B, and servers within server set 78 are accessible using virtual IP address within the private IP address space of Virtual Network C. Since the same IP address may exist within more than one of the private IP address spaces for Virtual Network A, Virtual Network B and Virtual Network C, there exists the potential for address collision once the packets on the core network 60 are stripped of their MPLS labels. For example, in the event that VND 62 is operating as an LER (Label-Edge Router) on the edge of the MPLS core 60, then the VND 62 removes the MPLS labels from packets arriving from the MPLS core 60. The MPLS labels are stripped off the packets and simultaneously used as keys to determine the virtual network on which each packet arrived.

In the embodiment shown in FIG. 3, the disclosed system uses the VLAN TAG fields in the packets carried over the Ethernet link 64 to distinguish between Virtual Networks existing in the core network 60. In this regard, the Virtual Networking Device 62 operates to identify the associated Virtual Network for packets it receives based on the MPLS header. The Virtual Networking Device 62 then removes the MPLS header, and inserts a VLAN ID field containing information identifying the associated Virtual Network for each packet before it transmits the packet onto the Ethernet link 64. When such a packet is received by the bridge or switch 66, the bridge or switch 66 removes the VLAN ID field and forwards the packet onto one of the Ethernet links 68, 70 and 72 associated with the contents of the VLAN ID field. Similarly, the bridge or switch 66 operates to insert VLAN ID fields into packets it forwards onto the Ethernet link 64, identifying the Virtual Network associated with the Ethernet link on which the packet was received. For example, the bridge or switch 66 would include information in the VLAN ID field indicating Virtual Network A when forwarding packets received from Ethernet link 68 onto Ethernet link 64, information indicating Virtual Network B when forwarding packets received from Ethernet Link 70, and information indicating Virtual Network C when forwarding packets received from Ethernet Link 72. The information in the VLAN ID field is then used by the Virtual Networking Device 62 to determine which Label Switched Path (LSP) within the core network 60 on which to forward a given packet received over the Ethernet link 64.

Figure 4:
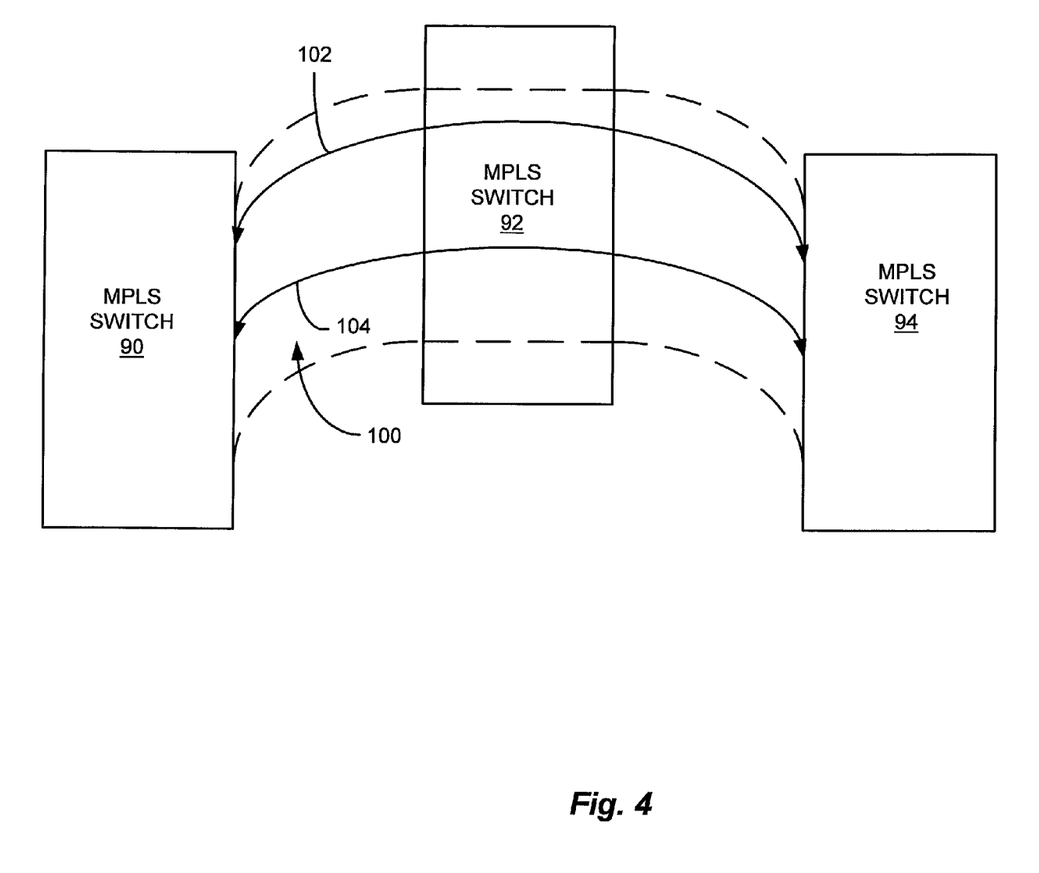
FIG. 4 shows an MPLS core over which multiple virtual networks are provided.

Another embodiment of the disclosed system is shown in FIG. 4, in which Virtual Networking Devices are shown as MPLS Switch 90, MPLS Switch 92, and MPLS Switch 94. The MPLS Switches 90, 92 and 94 may be located within an MPLS core network, such as the network 60 shown in FIG. 3. In the embodiment of FIG. 4, the packet encapsulation provided by the MPLS protocol is used to isolate data traffic flowing across different Virtual Networks. In this way, the disclosed system uses each Label Switched Path (LSP) as a virtual network. As shown in FIG. 4, an MPLS tunnel 100 is used to transparently convey traffic for both Virtual Network 102 and Virtual Network 104. Since the MPLS tunnel 100 is specified by a series of IP addresses, specifically the IP addresses of the MPLS switches 90, 92 and 94, the MPLS switches may need to use ARP to discover Layer 2 Ethernet/MAC address information for each other in order to transmit the MPLS packets, for example in the case where the MPLS switches 90, 92 and 94 are deployed over Ethernet or Gigabit Ethernet. In such a scenario, the encapsulating property of the MPLS protocol separates the Virtual IP Network traffic of Virtual Network A 102 and Virtual Network B 104 from the underlying physical link. Accordingly, each one of the MPLS switches 90, 92 and 94 operate to issue the disclosed request messages as shown in FIG. 2 to the IP address of the next-hop switch for the MPLS tunnel 100. In response, the destination device issues a response including its physical address (Ethernet/MAC address). Subsequently, all packets sent through the MPLS tunnel 100, regardless of whether they are on Virtual Network A 102 or Virtual Network B 104, are transmitted using the physical address of the next-hop.

Figure 5:
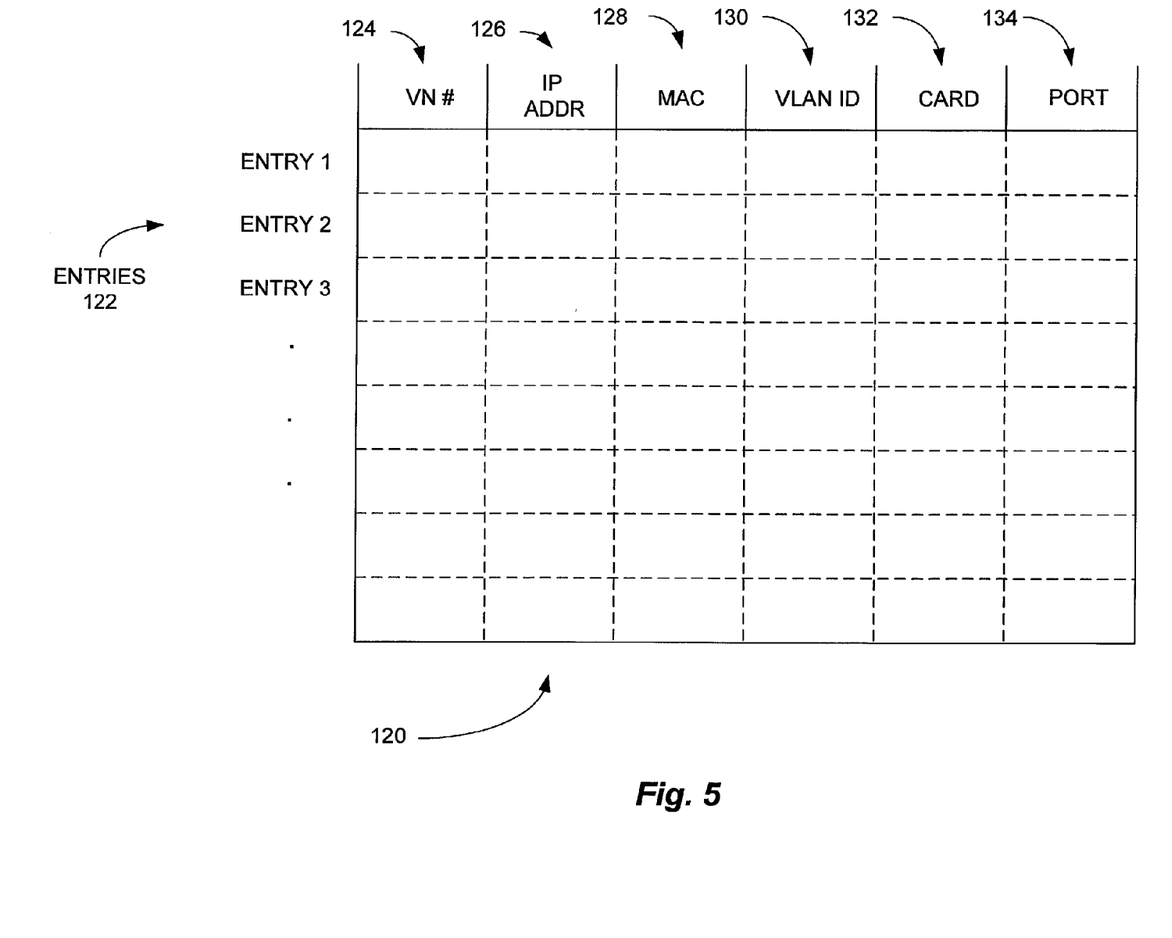
FIG. 5 shows a Virtual Network specific address translation table as maintained within a Virtual Networking Device.

FIG. 5 shows a translation table 120 used to store information mapping virtual IP addresses to Ethernet/MAC addresses. In an illustrative embodiment, each Virtual Networking Device maintains a separate translation table having the format shown in FIG. 5. The translation table 120 includes a number of entries 122. Each one of the entries 122 defines a mapping between a virtual IP address within a Virtual Network and an Ethernet/MAC address. The information in each of the entries 122 reflects information received in a response message to a request message 30 as shown in FIG. 2.

In the illustrative embodiment of FIG. 5, each of the entries 122 in the table 120 is shown including a Virtual Network number field 124, an IP Address field 126, an Ethernet/MAC address field 128, a Virtual Network identifier field 130, a card number field 132 and a port number field 134. When a response to the request message 30 of FIG. 2 is received, that response is associated with a Virtual Network. Accordingly, the Virtual Router for the Virtual Network associated with the response is used to handle the response. The protocol task for the routing protocol of the Virtual Network, in combination with the appropriate Virtual Router, determines a global value corresponding to the Virtual Network on which the response was received, based on the port/interface on which the request message was received, plus channelization information found in the packet header of the request. This global value uniquely identifies the Virtual Network, and is used to select one of the entries 122 based on the contents of the Virtual Network number field 124 in each entry. When a matching value is found in the Virtual Network number field 124, then the value of the IP Address field 126 of that entry is compared to the source IP address of the response. If there is no match, then another entry is selected having a Virtual Network number field 124 value matching the Virtual Network number of the Virtual Network on which the response was received. The source IP address of the response is then compared with the value of the IP address field 126 for that entry, and so forth until an entry is located includes Virtual Network number field 124 and IP address field 126 values matching those of the response. When a matching entry is found, then the source Ethernet/MAC address of the response is stored in the Ethernet/MAC address field 128 of the entry, and the contents of the Virtual Network (VLAN ID) field of the response is stored in the Virtual Network identifier field 130 of the entry. The specific I/O card and port through which the response was received are identified through values stored in the card field 132 and port field 134 respectively.

Subsequently, when a packet is to be transmitted over the Virtual Network associated with the Virtual Network number field 124 in the selected entry, and addressed to the IP address stored in the IP address field of that entry, information stored in the Ethernet/MAC field 128, Virtual Network identifier field 130, card field 132, and port field 134 of that entry are employed. For example, the contents of the Ethernet/MAC field 128 are stored as the Ethernet destination address of the packet, the contents of the Virtual Network identifier field 130 may be written to a Virtual Network identifier field within the packet, and the contents of the card field 132 and port field 134 may be used to select the I/O card and port through which the packet is to be transmitted. Alternatively, the contents of the Virtual Network identifier field 130 may not be specifically included in the transmitted packet.

Figure 6:
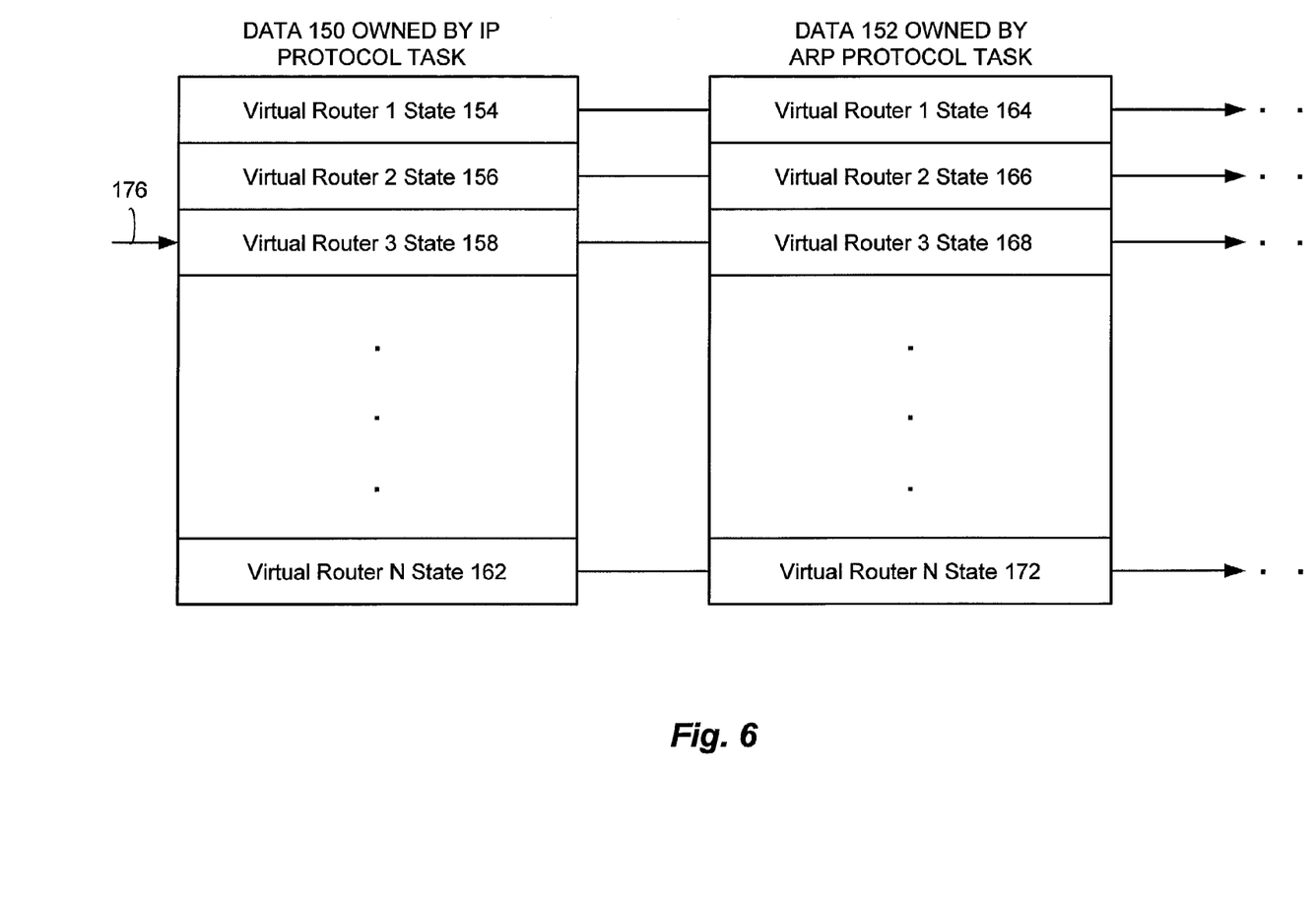
FIG. 6 shows context data structures for a virtual router.

FIG. 6 shows context data structures for a virtual router. As shown in FIG. 6, each protocol task maintains a separate copy of its state for each virtual router. Specifically, the data 150 owned by the IP protocol task includes state information associated with each virtual router, shown as virtual router 1 state 154, virtual router 2 state 156, virtual router 3 state 158, through virtual router N state 162. Similarly, the data 152 owned by the ARP protocol task includes state information associated with each virtual router, shown as virtual router 1 state 164, virtual router 2 state 166, virtual router 3 state 168, through virtual router N state 172. State information for the various virtual routers would be maintained for other protocol tasks as well, such as an OSPF routing protocol task. The protocol tasks use a common indexing scheme with regard to the virtual router states, but are not permitted to access data belonging to other protocol tasks. Through the common indexing scheme, data stored across multiple protocol tasks for a given virtual router is logically correlated, but the ownership of that data for is distributed among the protocol tasks. In the case of the data 152 owned by the ARP protocol task, each set of virtual router data contains both a table of resolved MAC addresses as well as a table of unresolved (outstanding) ARP requests.

As shown in FIG. 6, a routing context includes all state information across all protocol tasks that is associated with a given virtual router. For example, the routing context for virtual router 3 may be considered as the virtual router 3 state 158 owned by the IP protocol task, in combination with the virtual router 3 state 168 owned by the ARP task, in combination with any other virtual router 3 state for any other protocol tasks. In other words, an IP protocol context ("IP context") associated with virtual router 3, is shown as the virtual router 3 state 158 in FIG. 6. When a given protocol task, such as the IP protocol task, is executing, it operates as one virtual router at a time. For a protocol task to switch to operating as a different virtual router, a global state pointer is modified to point to new entry in the context data. FIG. 6 shows a global pointer 176 pointing to the virtual router 3 state data 158 within the data 150 owned by the IP protocol task. Accordingly, with the global pointer 176 so positioned, the IP protocol task would be operating as virtual router 3. Accordingly, all IP state is ultimately accessed through the global pointer 176. In the illustrative embodiment, a routing table consisting of a tree structure storing routes is replicated for every virtual router. As a result, each IP context contains such a tree structure. When a routing table operation is performed in such an embodiment, it is performed on the routing table contained in the context selected by the global pointer 176.

Figure 7:
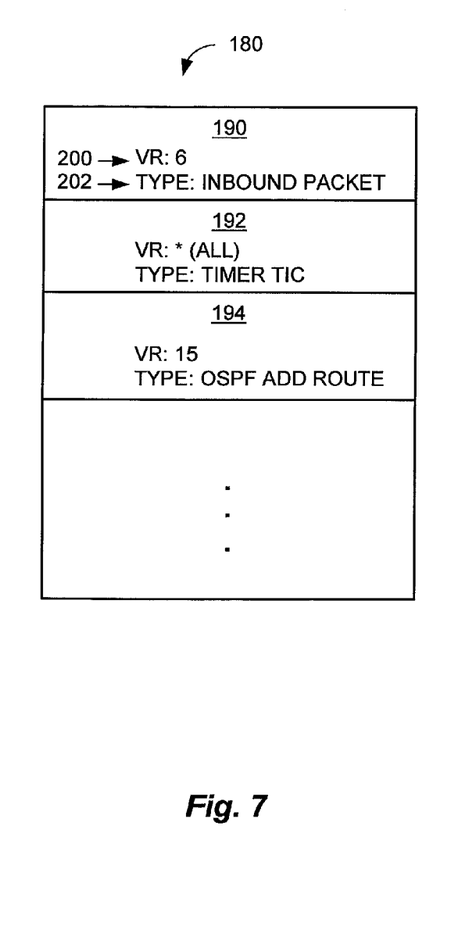
FIG. 7 shows an example of an event queue serviced by a protocol task.

FIG. 7 shows an example of an event queue serviced by a protocol task. In order for each virtual router to have a chance to process any timer-driven events, an event queue 180 is used to represent different kinds of events. The event queue 180 is, for purposes of illustration, an event queue that is serviced by the IP protocol task. Each entry on the queue contains some administrative information, including a destination virtual routing context and a message "type". For example, the first message 190 in the queue 180 includes a destination virtual routing context 200 indicating virtual router 6, and has a message type 202 indicating that the entry contains an inbound packet that requires further examination. While processing the entry 190, the IP protocol task sets a global context pointer to the context information for virtual router 6, and hands the packet off to a packet-processing routine. As a result, virtual router 6 may take some required action, such as sending a response packet, incrementing counters, etc. The IP protocol task does not perform any processing on behalf of any other virtual router until it has finished processing the entry 190.

Entry 192 in the queue 180 represents a timer tic. In response to the entry 192, the IP protocol task iterates through its table of routing contexts and increments time counters in each of the routing contexts. Processing of timer tic entries such as entry 192 may cause one or more actions to be taken by each virtual router.

Entry 194 in the queue 180 represents an event triggered by another protocol task. In FIG. 7, the entry 194 results from OSPF processing on virtual router 15 determining that a new route needs to be added to the IP routing table for that virtual router. During processing of entry 194, the IP protocol task sets the global context pointer to indicate the IP context for virtual router 15 and makes the necessary changes to the routing table contained within that context data.

Figure 8:
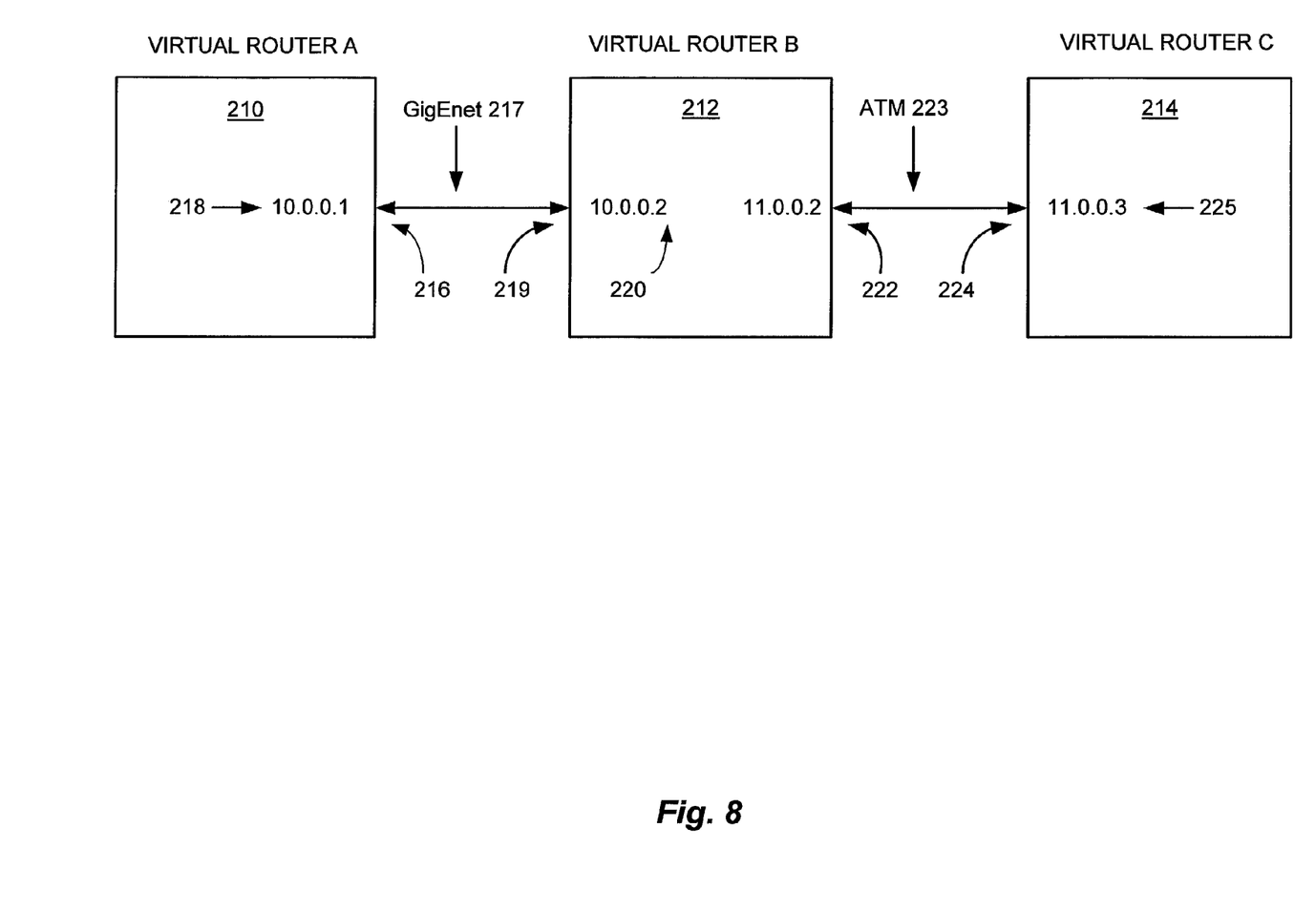
FIG. 8 is a block diagram showing three interconnected virtual routers.

FIG. 8 is a block diagram showing three interconnected virtual routers. In the example shown in FIG. 8, virtual routers A 210, B 212, and C 214 are configured on a common virtual network. Virtual router A 210 is shown with a single interface 216 to the gigabit Ethernet 217, with IP address 218 of 10.0.0.1. The virtual router B 212 also has an interface 219 to the gigabit Ethernet 217, having an IP address 220 of 10.0.0.2. The virtual router B 212 is shown also including an ATM interface 222 to an ATM link 223, having an IP address of 11.0.0.2. The ATM link 223 connects virtual router B 212 to virtual router C 214 through interface 224, which has an IP address 225 equal to 11.0.0.3.

During operation of the embodiment of the disclosed system shown in FIG. 8, virtual router A 210 may need to send a packet to virtual router C 214. In such a case, the destination IP address of the packet would be 11.0.0.3. However, ARP resolution for the address 11.0.0.3 may fail, since there is no 11.0.0.3 on the gigabit Ethernet link 217. Under such circumstances, the IP routing table for virtual router A 210 probably contains an entry such as the following:

| DESTINATION | Interface | Next-Hop |
| --- | --- | --- |
| 11.0.0.3 | GigEnet | 10.0.0.2 |

The next-hop address of 10.0.0.2 is provided to the ARP processing software along with the packet to be transmitted. In the case where a next-hop address exists, ARP resolution is performed on that address rather than on the destination address contained in the packet. However, if there is no next-hop address, as in the case where 10.0.0.1 is transmitting to 10.0.0.2, then the destination IP address from the packet is resolved instead by the following process: a hash function is applied to the IP address of the table entry to select one of 'k' hash buckets. The hash may alternatively be applied to a combination of the IP address of the table entry and the virtual network number of the table entry. Each bucket contains a linked list of entries (such as the entries 122 of FIG. 5), all of which have IP address field values that hash to the same value. In other words, the linked list contains entries which are associated by hash collisions. Accordingly, each linked list should be relatively short. In an alternative embodiment, each of the entries in the table 120 of FIG. 5 would be the leaf of a tree data structure. The IP address field of each entry would be used as a key into the tree structure. In either case, the ARP database is keyed, at least in part, off the destination IP address.

Further in the illustrative embodiment, the process by which an IP datagram is transmitted by a virtual router includes the following steps:

(1) The IP protocol task uses the virtual router's table to find the interface over which the packet will be sent, along with the IP address of the next intermediate hop (if any).

(2) If ARP resolution is needed, the packet and routing information describing the output interface and next-hop is sent to the ARP task. Otherwise, the packet can be transmitted immediately. ARP resolution isn't needed for media with channelization headers that are agreed upon at the time of provisioning such as MPLS or ATM.

(3) If the IP packet is to be sent to a next-hop, ARP resolution is performed on the next hop address. Otherwise, ARP resolution is performed on the destination address of the packet itself. ARP resolution consists of several steps:

(a) The translation table (120 in FIG. 5) for the virtual router is searched for an appropriate entry. If an appropriate entry is found, the resolution is complete. Otherwise, an ARP request is issued for the address, and the address and packet to be transmitted are added to a table of unresolved entries.

(b) If an ARP reply to the request issued in (a) above is received, the table entry for the destination IP address is moved to the table of resolved addresses, and the queued packet is transmitted using the newly-discovered layer 2 address information. Otherwise, the table entry will eventually time out, and be deleted from the table of unresolved entries, resulting in the queued packet being discarded. Redundant ARP requests may be periodically retransmitted until this time out occurs.

Those skilled in the art should readily appreciate that programs defining the functions of the disclosed system and method for providing an extension to the ARP protocol can be implemented in software and delivered to a computer system for execution in many forms; including, but not limited to: (a) information permanently stored on non-writable storage media (e.g. read only memory devices within a computer such as ROM or CD-ROM disks readable by a computer I/O attachment); (b) information stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

While the invention is described through the above exemplary embodiments, it will be understood by those of ordinary skill in the art that modification to and variation of the illustrated embodiments may be made without departing from the inventive concepts herein disclosed. In particular, while the illustrative embodiments are described as translating IP addresses to Ethernet/MAC addresses, the present invention is not limited to such an application, and those skilled in the art will recognize that the disclosed system and method may be applied to other types of address translation as well. Accordingly, the invention should not be viewed as limited except by the scope and spirit of the appended claims.

What is claimed is:

1. A method for identifying a physical address associated with a virtual address, wherein said physical address is associated with a network interface of a network device, wherein said virtual address is also associated with said network device, comprising:
   forming a request message at a first virtual networking device connected to a first virtual network, which is an MPLS network, and a second virtual network, which is an Ethernet, which share a physical link, and hosts on each network both use a same IP address, said request message including said virtual address and a virtual network identifier value, wherein said virtual network identifier value is stored in a field within a header of said request message separate from said virtual address, said virtual network identifier value associated with the first virtual network, said virtual network having a private address space including said virtual address;
   transmitting said request message over a communication link to a second virtual network device of the second virtual network which uses the virtual network identifier value to determine a virtual router responsible for responding to the request message;
   receiving a response to said request message at the first virtual network, said response including said physical address associated with said network interface of said network device;
   storing said physical address of said network device associated with said virtual address in an entry in a data structure, wherein said entry further includes said virtual network identifier and said virtual address; and
   translating IP addresses associated with the first virtual network to Ethernet/MAC addresses associated with the second virtual network with an address resolution table generated and maintained by the first virtual network device.

2. The method of claim 1, wherein said response to said request message includes said virtual address, and further comprising:
   determining, in response to header information in said response to said request message, a virtual network number identifying said virtual network; and
   identifying said entry in said data structure in response to said virtual network number and said virtual address.

3. The method of claim 1, further comprising:
   receiving a subsequent packet;
   determining a virtual network number associated with said subsequent packet;
   comparing said virtual network number associated with said subsequent packet to said virtual network number identifying said virtual network;
   determining a destination address of said subsequent packet;
   comparing said destination address of said subsequent packet with said virtual address; and
   forwarding said subsequent packet based on information contained in said entry in said data structure in the event that said virtual network number associated with said subsequent packet matches said virtual network number identifying said virtual network and said destination address of said subsequent packet matches said virtual address.

4. The method of claim 3, further comprising:
   selecting, responsive to said virtual network number, a virtual router from a plurality of virtual routers; and
   wherein said forwarding of said packet is performed in response to said virtual router.

5. The method of claim 4, further comprising:
   selecting, responsive to receipt of said subsequent packet, a protocol task associated with a predetermined routing protocol; and
   wherein said forwarding of said packet is performed in response to said protocol task and said virtual router.

6. The method of claim 1, wherein said virtual address is a network layer address.

7. The method of claim 4, wherein said virtual address is a virtual Internet Protocol (IP) address.

8. A system for identifying a physical address associated with a virtual address, wherein said physical address is associated with a network interface of a network device connected to a first virtual network, which is an MPLS network, and a second virtual network, which is an Ethernet, at a same time which share a physical link, and hosts on each network both use a same IP address, wherein said virtual address is also associated with said network device, comprising:
   at least one memory for storing program code;
   at least one processor, communicably coupled to said memory, said at least one processor operable to execute program code stored in said memory;
   program code, stored in said memory, said program code for identifying said physical address associated with said virtual address of a first virtual networking device of the first virtual network, said program code including program code for forming a request message to a second virtual networking device of the second virtual network, said request message including said virtual address and a virtual network identifier value, wherein said virtual network identifier value is stored in a field within a header of said request message separate from said virtual address, said virtual network identifier value associated with the first virtual network, said virtual network having a private address space including said virtual address, program code for transmitting said request message over a communication link to the second virtual networking device which uses the virtual network identifier value to determine a virtual router responsible for responding to the request message, program code for receiving a response to said request message, said response including said physical address associated with said network interface of said network device, and program code for storing said physical address of said network device associated with said virtual address in an entry in a data structure, wherein said entry further includes said virtual network identifier and said virtual address, said data structure translating IP addresses associated with the first virtual network to Ethernet/MAC addresses associated with the second virtual network with an address resolution table generated and maintained by the first virtual network device.

9. The system of claim 8, wherein said response to said request message includes said virtual address, and wherein said program code further comprises:

program code for determining, in response to header information in said response to said request message, a virtual network number identifying said virtual network; and program code for identifying said entry in said data structure in response to said virtual network number and said virtual address.

10. The system of claim 8, wherein said program code further comprises:

program code for receiving a subsequent packet;

program code for determining a virtual network number associated with said subsequent packet;

program code for comparing said virtual network number associated with said subsequent packet to said virtual network number identifying said virtual network;

program code for determining a destination address of said subsequent packet;

program code for comparing said destination address of said subsequent packet with said virtual address; and program code for forwarding said subsequent packet based on information contained in said entry in said data structure in the event that said virtual network number associated with said subsequent packet matches said virtual network number identifying said virtual network and said destination address of said subsequent packet matches said virtual address.

11. The system of claim 10, wherein said program code further comprises:

program code for selecting, responsive to said virtual network number, a virtual router from a plurality of virtual routers; and wherein said program code for forwarding said packet operates responsively to said virtual router.

12. The system of claim 11, wherein said program code further comprises:

program code for selecting, responsive to receipt of said subsequent packet, a protocol task associated with a predetermined routing protocol; and wherein said program code for forwarding of said packet operates in response to said protocol task and said virtual router.

13. The system of claim 8, wherein said virtual address is a network layer address.

14. The system of claim 13, wherein said virtual address is a virtual Internet Protocol (IP) address.

15. A system for identifying a physical address associated with a virtual address, wherein said physical address is associated with a network interface of a network device connected to a first virtual network, which is an MPLS network, and a second virtual network, which is an Ethernet, at a same time which share a physical link, and hosts on each network both use a same IP address, wherein said virtual address is also associated with said network device, comprising:

means for forming a request message, said request message including said virtual address and a virtual network identifier value, wherein said virtual network identifier value is stored in a field within a header of said request message separate from said virtual address, said virtual network identifier value associated with the first virtual network, said virtual network having a private address space including said virtual address;

means for transmitting said request message over a communication link to a second virtual network device of the second virtual network which uses the virtual network identifier value to determine a virtual router responsible for responding to the request message;

means for receiving a response to said request message, said response including said physical address associated with said network interface of said network device; and means for storing said physical address of said network device associated with said virtual address in an entry in a data structure, said data structure translating IP addresses associated with the first virtual network to Ethernet/MAC addresses associated with the second virtual network with an address resolution table generated and maintained by the first virtual network device wherein said entry further includes said virtual network identifier and said virtual address.

* * * * *